March 16, 1965 B. EASTER ETAL 3,174,104

ELECTRIC SIGNAL COMBINING ARRANGEMENTS

Filed Sept. 28, 1961

4 Sheets-Sheet 1

INVENTORS
BRIAN EASTER
JOHN MEARS SIDWELL
BY Kirschstein, Kirschstein & Ottinger
ATTORNEYS INVENTORS
BRIAN EASTER
JOHN MEARS SIDWELL
BY Kirschstein, Kirschstein & Ottinger
ATTORNEYS

ELECTRIC SIGNAL COMBINING ARRANGEMENTS

INVENTORS
BRIAN EASTER
JOHN MEARS SOWELL
BY
ATTORNEYS

March 16, 1965 B. EASTER ETAL 3,174,104

ELECTRIC SIGNAL COMBINING ARRANGEMENTS

Filed Sept. 28, 1961 4 Sheets-Sheet 4

INVENTORS
BRIAN EASTER
JOHN MEARS SOWELL
BY Kirschstein, Kirschstein & Ottinger
ATTORNEYS United States Patent Office 3,174,104

Patented Mar. 16, 1965

3,174,104

ELECTRIC SIGNAL COMBINING ARRANGEMENTS

Brian Easter, Beaconsfield, and John Mears Sidwell, Wembley, England, assignors to The General Electric Company Limited, London, England Filed Sept. 28, 1961, Ser. No. 141,375
Claims priority, application Great Britain, Sept. 30, 1960, 33,694/60
15 Claims. (Cl. 325—369)

Figure 1:
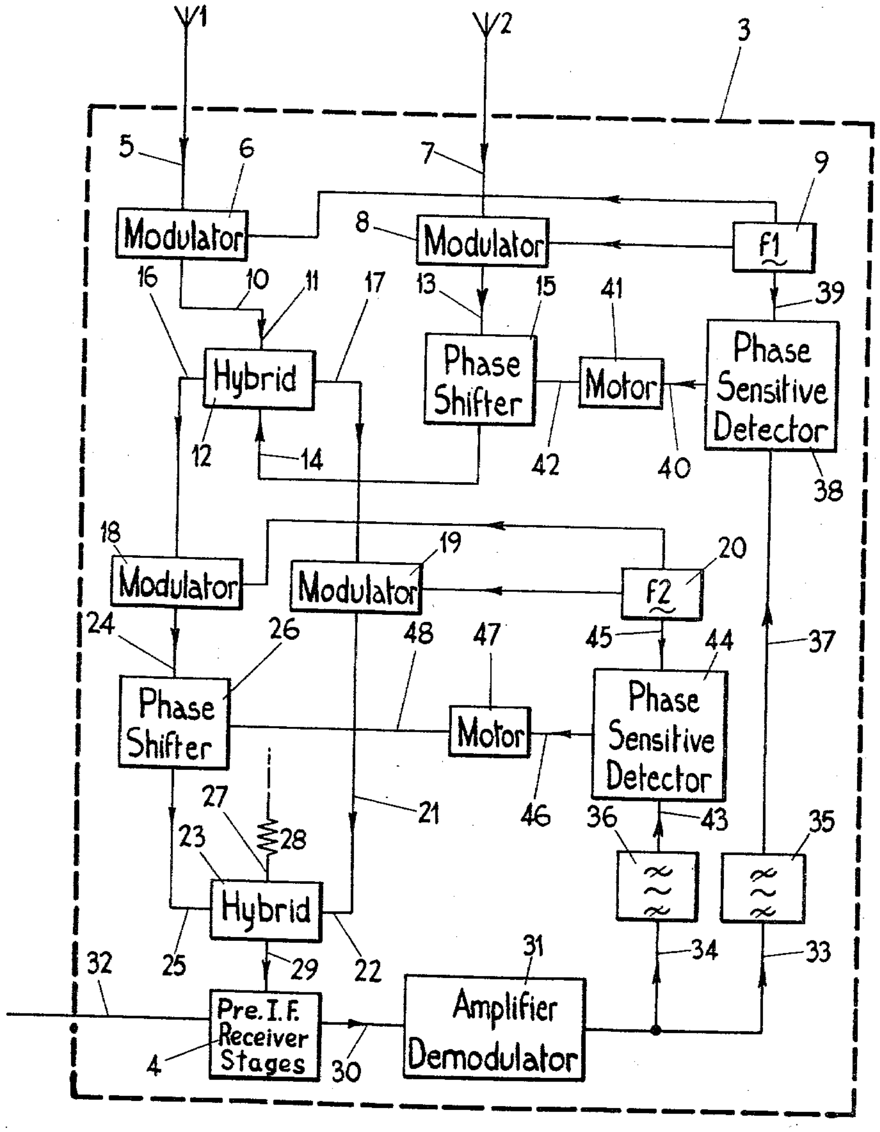

This invention relates to electric signal combining arrangements.

The invention is particularly concerned with arrangements of the kind which is for combining the radio frequency signals received simultaneously on a pair of spaced antennae to provide a joint input to a radio receiver.

The invention is also concerned with radio diversity receiving systems employing electric signal combining arrangements of the kind specified.

In connection with a radio diversity receiving system, it has been proposed to bring the two radio frequency signals obtained from a pair of spaced antennae into a cophasal condition by means of adjustable phasing means and then to combine those signals by means of a hybrid network to provide a joint input to a radio receiver, automatic adjustment of the phasing means being obtained by providing modulating means for differentially phase modulating the two radio frequency signals at a predetermined frequency, means for deriving from the combined radio frequency signals the envelope wave of amplitude modulation due to said differential phase modulation and means for automatically controlling the adjustment of said phasing means according to the phase of the envelope wave component of said predetermined frequency.

Such an arrangement has the disadvantage that the combined radio frequency signals comprise the total energy of the individual signals obtained from the antennae only when those individual signals are equal in magnitude. This is because the hybrid network acts to provide two outputs which comprise respectively the vector sum and the vector difference of the signals that are supplied thereto. Consequently the total energy of said individual signals can appear in one of the two outputs only if the energy content of the other output is zero and this condition cannot prevail unless these individual signals have equal magnitudes.

It is an object of the present invention to provide improved electric signal combining arrangements of the kind specified which do not have the disadvantage mentioned above.

According to the present invention, an electric signal combining arrangement for use in a radio diversity receiving system to combine radio frequency signals received simultaneously on two spaced antennae comprises signal transforming means which is arranged to be supplied with the two radio frequency input signals and which is arranged to supply two further radio frequency signals in response to those input signals, each further signal being derived from both said input signals, first adjustable phasing means which is included in said transforming means and which is arranged to afford a control over the relative magnitudes of said further signals, combining means which is arranged to transfer substantially all the energy of said further signals into a single radio frequency output signal only when those further signals are of equal magnitude and have a predetermined phase relationship, second adjustable phasing means to adjust the relative phase of said further signals, and automatic control means which is arranged to control automatically the adjustment of both said phasing means so that, during operation, the magnitudes of said further signals are maintained substantially equal and the relative phase of those signals is adjusted to maintain said predetermined phase relationship, the arrangement being such that the output signal obtained, during operation, from said combining means contains substantially all the energy of the two corresponding radio frequency input signals supplied to said signal transforming means irrespective of the relative levels and phases of those input signals.

According to one feature of the present invention, an electric signal combining arrangement for use in a radio diversity receiving system to combine radio frequency signals received simultaneously on two spaced antennae comprises first hybrid means which is arranged to be supplied with the two radio frequency input signals to be combined and which is arranged to combine those signals so as to produce two further radio frequency signals, first adjustable phasing means for adjusting the relative phase of the signals that are supplied, during operation, to said first hybrid means, second hybrid means which is for combining said further signals into a single output signal, second adjustable phasing means for adjusting the relative phase of said further signals that are supplied, during operation, to said second hybrid means and automatic control means which is arranged to control automatically the adjustment of both said phasing means, the arrangement being such that the output signal obtained, during operation, from said second hybrid means contains substantially all the energy of the two corresponding radio frequency signals supplied to the arrangement irrespective of the relative levels and phases of those signals.

According to another feature of the present invention, an electric signal combining arrangement for use in a radio diversity receiving system to combine two plane-polarised radio frequency waves obtained from two spaced antennae respectively comprises transducer means which is arranged to be supplied with the two input waves to be combined so that the planes of polarisation of those waves are generally at right angles and which is arranged to resolve said input waves into two other waves that are polarised in predetermined planes at right angles to one another, each of said other waves being derived from both said input waves, first adjustable phasing means which is arranged to afford a control over the relative magnitudes of said other waves, converting means which is arranged to be supplied with said other waves and which is arranged to convert two waves of equal magnitude that are polarised in said predetermined planes into two further waves of polarisation such that they can be resolved into a single wave which is polarised in a plane determined by the relative phase of said further waves, automatic control means having a first control circuit which is arranged to control automatically the adjustment of said first adjustable phasing means so as, during operation, to maintain the magnitudes of said other waves substantially equal, second adjustable phasing means to adjust the relative phase of said further waves that are obtained, during operation, from said converting means, a second control circuit of said automatic control means which is arranged to control automatically the adjustment of said second adjustable phasing means so as, during operation, to maintain the relative phase of said further waves such that they can be resolved into a wave which is polarised in a particular plane, and combining means which is arranged to resolve said further waves into the corresponding plane-polarised wave and which has an output arm for propagating a wave that is polarised in said particular plane, the arrangement being such that, during operation, there is propagated in said output arm as an output signal a plane-polarised wave which contains substantially all the energy of the two corresponding input plane-polarised waves supplied to said transducer means irrespective of the relative levels and phases of those input waves.

According to a further feature of the present invention, an electric signal combining arrangement for use in a radio diversity receiving system to combine two plane-polarised radio frequency waves obtained from two spaced antennae respectively comprises transducer means which is arranged to be supplied with the two input waves to be combined so that the planes of polarisation of those waves are generally at right angles and which is arranged to resolve said input waves into two other radio frequency waves of equal magnitude that are polarised in two perpendicular planes, each of said other waves being derived from both said input waves, first adjustable phasing means which is arranged to be supplied with said other waves and which is arranged to convert two radio frequency waves of equal magnitude that are polarised in perpendicular planes which have a predetermined relationship with its setting into two further radio frequency waves of polarisation such that they can be resolved into a single radio frequency wave which is polarised in a plane determined by the relative phase of said further waves, automatic control means having a first control circuit which is arranged to control automatically the setting of said first adjustable phasing means so as, during operation, to maintain that setting in said predetermined relationship with the planes of polarisation of said other waves, second adjustable phasing means to adjust the relative phase of said further waves that are obtained, during operation, from said first adjustable phasing means, a second control circuit of said automatic control means which is arranged to control automatically the adjustment of said second adjustable phasing means so as, during operation, to maintain the relative phase of said further waves such that they can be resolved into a wave which is polarised in a particular plane, and resolving means which is arranged to resolve said further waves into the corresponding plane-polarised wave and which has an output arm for propagating a wave that is polarised in said particular plane, the arrangement being such that, during operation, there is propagated in said output arm as an output signal a plane-polarised wave which contains substantially all the energy of the two corresponding input plane-polarised waves supplied to said transducer means irrespective of the relative levels and phases of those input means.

Three radio diversity receiving systems which employ different examples of electric signal combining arrangements in accordance with the present invention will now be described with reference to FIGURES 1 and 2 of the drawings accompanying the Provisional Specification and to the three figures of the accompanying drawings which are numbered as FIGURES 3, 4 and 5.

Figure 2:
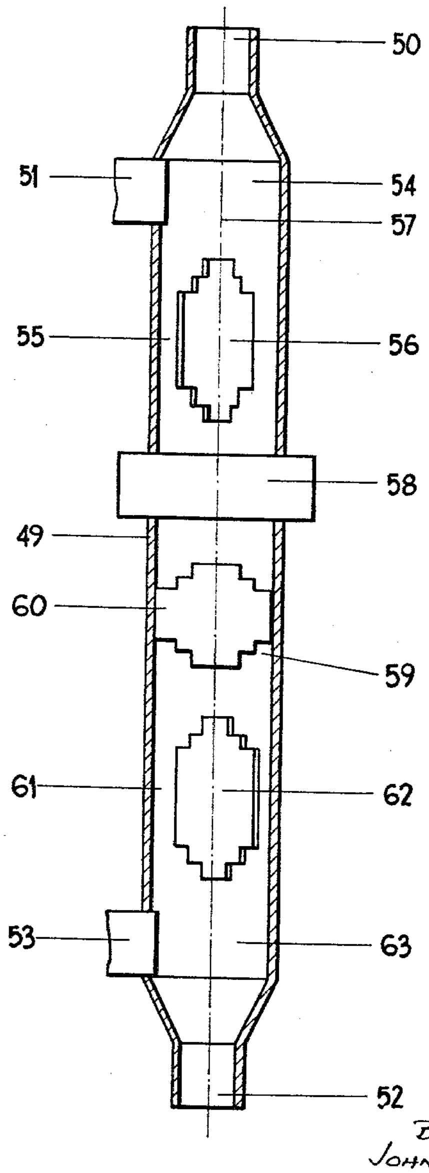
Figure 3:
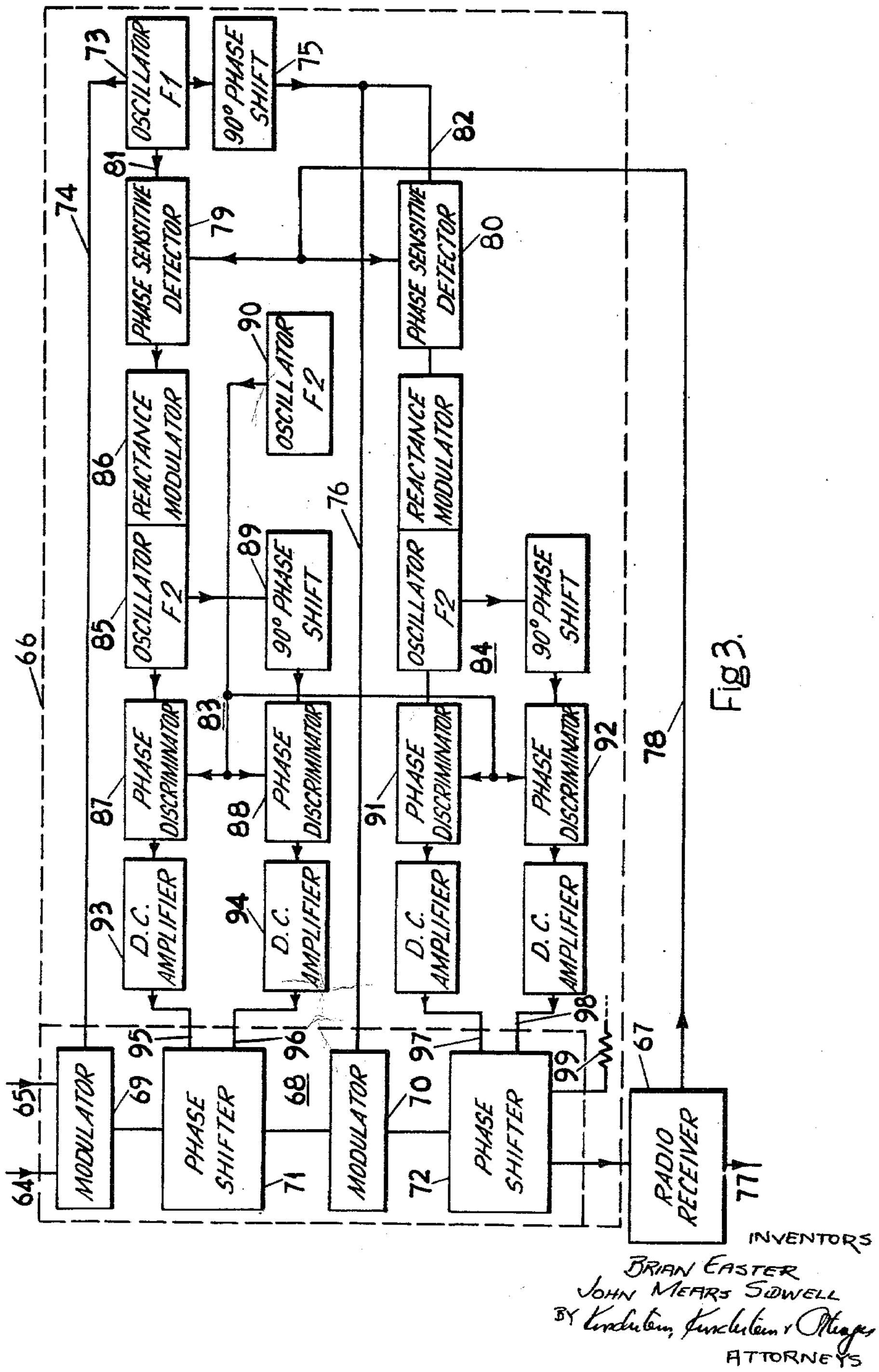
Figures 4, 5:
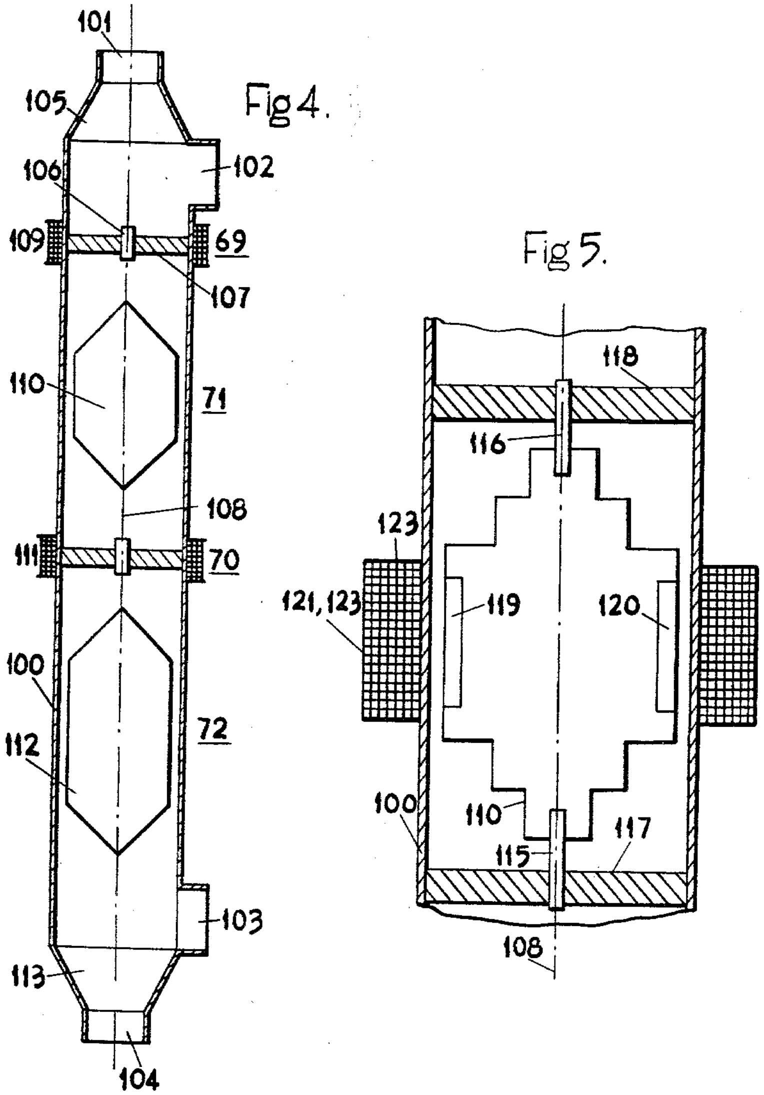

In the drawings:

FIGURE 1 shows a first one of the radio diversity receiving systems schematically, FIGURE 2 shows part of a second one of the radio diversity systems schematically, FIGURE 3 shows the third one of the radio diversity receiving systems schematically, FIGURE 4 shows schematically a waveguide structure which forms part of the system shown in FIGURE 3, and FIGURE 5 shows a phase shifter which forms part of the waveguide structure shown in FIGURE 4.

Each of the radio diversity receiving systems to be hereinafter described comprises two antennae which are spaced apart, an electric signal combining arrangement which is for combining the two radio frequency signals received simultaneously on the antennae and a radio receiver which is arranged to demodulate the combined signals. As will be hereinafter described, each example of electric signal combining arrangement is arranged so that the combined signals which, during operation, are supplied to the associated radio receiver containing substantially all the energy of the two corresponding radio frequency signals obtained from the associated antennae irrespective of the relative levels and phases of those signals.

The radio diversity receiving system of FIGURE 1 comprises two spaced antennae 1 and 2, an electric signal combining arrangement 3 and a superheterodyne radio receiver of which only a part 4 is shown. The part 4 of the radio receiver is included in the combining arrangement 3 and is arranged to convert the combined radio frequency signals into an intermediate frequency signal.

The antennae 1 and 2 are connected to the combining arrangement 3 by paths 5 and 7 respectively. In the combining arrangement 3 the path 5 is connected to a phase modulator 6 while the path 7 is connected to a phase modulator 8. A path 10 connects the modulator 6 to one input arm 11 of a hybrid junction 12 while a path 13 connects the modulator 8 to an adjustable phase shifter 15 which preferably is continuously adjustable but which alternatively may be only adjustable over a range of about $3\pi$ radians. The phase shifter 15 is connected to the other input arm 14 of hybrid junction 12. The output arms 16 and 17 of the hybrid junction 12 are respectively connected to two phase modulators 18 and 19 of which the modulator 18 is connected by a path 24 to an adjustable phase shifter 26 and the modulator 19 is connected by a path 21 to one input arm 22 of a hybrid junction 23 that is identical with the hybrid junction 12. The phase shifter 26 is identical with the phase shifter 15 and is connected to the other input arm 25 of the hybrid junction 23. One output arm 27 of the hybrid junction 23 is terminated in a matched load impedance 28 while the other output arm 29 is connected to the part 4 of the radio receiver.

The paths 5 and 7 together with that portion of the combining arrangement 3 which is described above and which is connected between the paths 5 and 7 and the part 4 of the radio receiver are constructed in rectangular waveguide. In this connection the hybrid junctions 12 and 23 are each of the so-called "Magic T" type, the input arms 11 and 14 of the hybrid junction 12 comprising its H-plane arm and its E-plane arm respectively and the output arms 27 and 29 of the hybrid junction 23 comprising its E-plane arm and H-plane arm respectively. The arms 16 and 17 and the arms 22 and 25 comprise the main arms of the "Magic T" hybrid junctions 12 and 23 respectively. Each phase shifter 15 or 26 is of any suitable type that is adjustable mechanically by the rotation of a member (not shown). Thus each phase shifter 15 or 26 may be of the type in which the position of a slab of dielectric material within a section of rectangular waveguide is varied upon rotation of said member. Each modulator 6, 8, 18 or 19 may be of the type in which ferrite material within a section of rectangular waveguide is subjected to a magnetic field the magnitude of which is varied at the modulating frequency.

The radio frequency output obtained over the H-plane arm 29 of the hybrid junction 23 is supplied to the part 4 of the superheterodyne receiver, the part 4 including a mixer stage (not shown) which serves to convert the signal supplied thereto to an intermediate frequency signal as aforesaid. A part of this intermediate frequency signal is supplied over a line 30 to an amplifying and demodulating unit 31. The remainder of this signal is amplified in the intermediate frequency amplifier stages (not shown)

of the receiver that are connected to a line 32 and then is demodulated to derive the intelligence signal conveyed by the radio frequency signals received on the antennae 1 and 2.

The amplifying and demodulating unit 31 is connected over lines 33 and 34 to two band-pass filters 35 and 36 respectively of which the filter 35 is arranged to pass signals of a first predetermined low frequency F1 only and the filter 36 is arranged to pass signals of a second predetermined low frequency F2 only. The filter 35 is connected over a line 37 to a phase sensitive detector 38 which is arranged to be supplied over a line 39 with a reference signal of the frequency F1 by an oscillator 9. This oscillator is also arranged to supply oscillations of the frequency F1 to each of the modulators 6 and 8. The phase sensitive detector 38 is connected over a line 40 to an electric motor 41 between which and the rotatable control member (not shown) of the phase shifter 15 there is a mechanical coupling 42.

The filter 36 is connected over a line 43 to a phase sensitive detector 44 which is arranged to be supplied over a line 45 with a reference signal of the frequency F2 by an oscillator 20. This oscillator is also arranged to supply oscillations of the frequency F2 to each of the modulators 18 and 19. The phase sensitive detector 44 is connected over a line 46 to an electric motor 47 between which and the rotatable control member (not shown) of the phase shifter 26 there is a mechanical coupling 48.

The frequencies F1 and F2 are chosen to facilitate their separation by means of the filters 35 and 36 and are both below the lowest frequency of the intelligence signals that are conveyed by the radio frequency signals received on the antennae 1 and 2.

The radio frequency signals supplied, during operation, over the paths 5 and 7 are both plane-polarised waves and are applied to the modulators 6 and 8 wherein they are each phase modulated at the frequency F1 with oscillations supplied by the oscillator 9. The modulators 6 and 8 are arranged jointly to effect a differential phase-modulation of the applied signals through an angle of the order of ±⅓ radian. The phase-modulated signal obtained from the modulator 8 is applied to the phase shifter 15 which, as will be hereinafter described, is arranged to control automatically the phase of that signal so that the two signals supplied to the arms 11 and 14 of the hybrid junction 12 are always substantially in phase quadrature. In this way it is arranged that the two further radio frequency signals which are obtained from the arms 16 and 17 of the hybrid junction 12 and which comprise plane-polarised waves are always of equal magnitude since these further signals correspond to the vector sum and the vector difference of the original signals supplied to the arms 11 and 14.

The said further signals are applied to the modulators 18 and 19 wherein they are each phase modulated at the frequency F2 with oscillations supplied by the oscillator 20. The modulators 18 and 19 are arranged jointly to effect a differential phase-modulation of said further signals through an angle of the order of ⅓ radian.

The phase shifter 26 is arranged to be adjusted automatically so that the said two further signals that are obtained from the modulators 18 and 19 are brought into a condition of phase opposition before they are applied to the arms 22 and 25 of the hybrid junction 23. The signals obtained from the arms 27 and 29 of the hybrid junction 23 corresponds to the vector sum and the vector diffence respectively of the signals supplied to the arms 22 and 25. Because said further signals which are supplied to the arms 22 and 25 of the hybrid device are of equal magnitude and are in phase opposition an output signal is obtained from the arm 29 only, this output signal comprising a plane-polarised radio frequency wave which contains substantially all the energy of the corresponding signals obtained from the antennae 1 and 2.

As the result of the supply to the part 4 of the radio receiver of the combined radio frequency outputs from the antennae 1 and 2 there is obtained from the amplifier and demodulator unit 31 the envelope waves of the amplitude modulation which is due to the differential phase-modulation by the modulators 6 and 8 at the frequency F1 and by the modulators 18 and 19 at the frequency F2. Clearly the phase of the envelope wave component of the frequency F1 that is supplied through the filter 35 and over the line 37 to the phase sensitive detector 38 relative to the phase of the oscillations of the frequency F1 that are supplied to that detector over the line 39 depends upon the setting of the phase shifter 15. Similarly, the phase of the envelope wave component of frequency F2 that is supplied over the line 43 to the phase detector 44 relative to the phase of the oscillations of the frequency F2 that are supplied to that detector over the line 45 depends upon the setting of the phase shifter 26. Each of the phase detectors 38 and 44 is arranged so that a control signal is supplied thereby to the associated motor 41 or 47 only when the associated phase shifter 15 or 26 is incorrectly adjusted, the sense of the control signal being such that the motor 41 or 47 acts to reduce the error in the adjustment.

Various variations in the combining arrangement 3 of the radio diversity receiving system described above are possible. Thus the phase modulators 6 and 19 may be omitted if the remaining modulators 8 and 18 are each operated at a greater depth of modulation to maintain the desired phase differential. Also the use of hybrid junctions of the so-called "Magic T" type is not essential and any convenient form of hybrid device may be used. Again, it is not essential to employ phase shifters 15 and 26 that are adjustable mechanically as these phase shifters and their associated motors 41 and 47 may be replaced by phase-shifters (not shown) of a type employing ferrite material whereby the phase shift produced is arranged to be adjusted electrically as, for example, by varying the magnitude of a magnetic field.

The reference signals which are supplied by the oscillators 9 and 20 do not have to be of different frequencies. Thus these reference signals can have the same frequency if they are arranged to have a phase relationship such that the corresponding envelope wave components that are obtained from the amplifying and demodulating unit 31 are substantially in phase quadrature.

It will be appreciated that with the radio diversity receiving sytem described above, there exists an alternative setting of the phase-shifter 26 such that the signals supplied to the main arms 22 and 25 of the hybrid junction 23 are brought into phase agreement. Under these conditions substantially all the energy of the radio frequency outputs from the antennae 1 and 2 is transferred to the E-plane arm 27 and none to the H-plane arm 29. In view of this, a standby radio receiver (not shown) may be connected to the E-plane arm 27 in place of the impedance 28 and the automatic control arrangement for the phase shifter 26 that is provided by the units 18, 19, 20, 21, 36, 44 and 47 of the combining arrangement 3 may be adapted to switch the phase shifter 26 to this alternative setting in the event of the radio receiver failing.

The second radio diversity receiving system differs from the system described above in that the phase shifter 15, the hybrid junction 12, the modulators 18 and 19, the phase shifter 26 and the hybrid junction 23 of the combining arrangement 3 are all replaced by the waveguide structure which is shown schematically in FIGURE 2. This structure is constructed mainly of circular waveguide 49 and has two inlet ports 50 and 51 and two outlet ports 52 and 53 that are in rectangular waveguide. As will be hereinafter described the waveguide structure is arranged so that substantially all the energy of two plane-polarised radio frequency signals that are supplied to the inlet ports 50 and 51 is transferred to a single plane-polarised radio frequency signal which is normally obtained from the outlet port 52 but which may be obtained from the outlet port 53.

The ports 50 and 51 are mutually perpendicular and couple into a transducer section 54. This transducer section 54 is coupled to a continuously variable phase shifter 55 which, in the present example, is a so-called "half-wave plate" and comprises a plate 56 of dielectric material mounted for rotation about the longitudinal axis 57 of the circular waveguide 49. The phase shifter 55 is followed by phase modulator 58 which, in turn, is followed by a so-called "quarter-wave plate" 59 comprising a fixed plate 60 of dielectric material. The quarter-wave plate 59 is coupled to another continuously variable phase shifter 61 which is identical with the phase shifter 55 and which, in turn, is coupled to another transducer section 63. The transducer section 63 has the outlet ports 52 and 53 which are mutually perpendicular and which, in the present structure are positioned so that they each have the same orientation as a different one of the inlet ports 50 and 51 although this is not essential.

Each of the inlet ports 50 and 51 is coupled through rectangular waveguide (not shown) to a different one of the two antennae (not shown) of the system, these two couplings including two phase modulators (not shown) respectively which are for differentially phase modulating at the frequency F1 the two plane-polarised radio frequency signals obtained from the antennae. The outlet port 52 is coupled through rectangular waveguide (not shown) to a radio receiver (not shown) of the system. The outlet port 53 is coupled through rectangular waveguide (not shown) either to a matched load (not shown) or to a standby radio receiver (not shown) which is for use in the event of failure of the other radio receiver.

In operation of the system, the two plane-polarised radio frequency signals which are obtained from the two antennae and which are differentially phase modulated at the frequency F1 are supplied into the transducer section 54 through the inlet ports 50 and 51. Because these signals are in space quadrature they give rise to an elliptically polarised wave in this transducer section 54. In the phase shifter 55 a differential phase shift of 180° is introduced for polarisation normal and parallel to the plate 56 and the elliptically polarised wave applied to this phase shifter is rotated through an angle determined by the position of the plate 56.

An elliptically polarised wave may be regarded as two plane-polarised signals which are in space quadrature. Furthermore, if these two plane-polarised signals are polarised in directions which are each at an angle of 45° to the major axis of the corresponding elliptical polarisation then the magnitudes of these signals are equal. The plate 56 is arranged to be positioned automatically to rotate the elliptically-polarised wave so that the two corresponding plane-polarised signals which are polarised in the same directions as the two signals supplied to the inlet ports 50 and 51 are of equal magnitude.

The two signals of equal magnitude that are obtained from the phase shifter 55 are differentially phase modulated at the frequency F2 by means of the modulator 58 and then are applied to the plate 60. The plate 60 is at an angle of 45° to the directions of polarisation of these signals which therefore are each converted to a circularly-polarised wave. This is because the plate 60 introduces a differential phase shift of 90° for polarisation normal and parallel thereto. The two circularly-polarised waves are of equal amplitude but are polarised in opposite senses. Consequently they are equivalent to a single plane-polarised signal, the direction of polarisation of which is dependent upon the phase difference between these circularly-polarised waves. This phase difference is adjustable by means of the phase shifter 61 which is arranged to be set automatically so that the plane-polarised signal which is the equivalent of the two circularly-polarised waves is polarised in direction appropriate to the appearance of all the energy of this signal at the required one of the outlet ports 52 and 53. In the particular case under consideration this is the outlet port 52.

The phase shifters 55 and 61 are arranged to be controlled by electric motors (not shown) in the same way as is described for the phase shifters 15 and 26 (FIGURE 1) of the first system described above.

A number of variations in the waveguide structure described above are possible. Thus it is not necessary for the plane-polarised signals that are supplied to the inlet ports 50 and 51 to be differentially phase modulated at the frequency F1. The same effect as this differential phase modulation is obtained if the plate 56 is oscillated through a small angle about the longitudinal axis 57 of the circular waveguide 49 at the frequency F1. Similarly the phase modulator 58 can be dispensed with if the plate 62 is oscillated through a small angle about the axis 57 at the frequency F2.

The phase shifters 55 and 61 may comprise devices which employ ferrite material and in which the required rotation of the planes between which differential phase shift occurs is produced by a rotation of a magnetic field.

The actual effect of the phase-shifter 55 is to bring the major axis of the elliptically polarised wave that is obtained in the transducer section 54 into line with the plane of the plate 60. Therefore it will be appreciated that the same result is achieved by bringing the plane of the plate 60 into line with the major axis of the said elliptically polarised wave. This means that the phase-shifter 55 can be dispensed with if the plate 60 is mounted for rotation about the longitudinal axis 57 of the circular waveguide 49 and is arranged to be positioned automatically so that it is always substantially in line with the major axis of the said elliptically polarised wave. This is done in the third radio diversity receiving system now to be described.

Referring to FIGURE 3, the third radio diversity receiving system comprises two spaced antennae 64 and 65, the third example of electric signal combining arrangement 66 and a radio receiver 67. The combining arrangement 66 includes a waveguide structure 68 which is connected between the antennae 64 and 65 and the radio receiver 67 and which is arranged, as will be hereinafter described, so that all the energy of two plane-polarised radio frequency signals that comprise the outputs of the antennae 64 and 65 is transferred to a single plane-polarised radio frequency signal which is supplied to the radio receiver 67.

The waveguide structure 68 comprises two phase modulators 69 and 70 and two continuously variable phase shifters 71 and 72 which are associated with the modulators 69 and 70 respectively. In each of the modulators 69 and 70 the applied radio frequency signals are differentially phase-modulated at a low frequency F1, for example, 35 cycles per second, by oscillations generated by an oscillator 73. In this connection, part of the output of the oscilltaor 73 is supplied directly to the modulator 69 over a line 74. Another part of the output of the oscilltaor 73 is supplied to a phase shift network 75 and thus is retarded in phase by 90°. Phase retarded oscillations of the frequency F1 that are obtained from the phase shift network 75 are supplied to the modulator 70 over a path 76.

The radio receiver 67 comprises a superheterodyne receiver and includes a mixer stage (not shown) whereby an intermediate frequency signal is derived from the radio frequency output of the waveguide structure 68. The major portion of this intermediate frequency signal is amplified in the intermediate frequency amplifier stages (not shown) of the receiver 67 and is then demodulated to derive the intelligence signal conveyed by the radio frequency signals received on the antennae 64 and 65. This intelligence signal is supplied by the receiver 67 to a line 77. The remaining portion of the intermediate frequency signal is supplied to an amplifying and demodulating unit (not shown) of the radio receiver 67 from which unit there is obtained the two envelope waves of the amplitude modulation that is due to the differential phase modulation by the modulators 69 and 70 at the frequency F1. These two envelope wave components are supplied by the radio receiver 67 to a line 78.

The line 78 is connected to two phase-sensitive detectors 79 and 80 which also are connected over lines 81 and 82 to the oscillator 73 and the phase shift network 75, respectively. These phase sensitive detectors 79 and 80 are each included in a different one of two control circuits 83 and 84 which are arranged to control automatically the adjustment of the phase shifters 71 and 72 respectively. The control circuits 83 and 84 are identical so that only the control circuit 83 which is associated with the phase shifter 71 will be described in detail.

In the control circuit 83, the phase sensitive detector 79 is arranged to produce a direct current output signal the value of which varies according to the phase of the envelope wave component of frequency F1 on the line 78 that is due to the modulation effected by the associated modulator 69 relative to the phase of the signal of frequency F1 that is supplied to the line 81 by the oscillator 73. This output signal is employed to control the operating frequency of a variable oscillator 85. Thus said output signal is supplied to a reactance modulator 86 which is associated with the oscillator 85. The operating frequency of the oscillator 85 is variable over a small range which is approximately centered on a predetermined frequency F2, for example, 3000 cycles per second.

Part of the output of the oscillator 85 is supplied directly to a phase discriminator 87. The remainder of this output is supplied to a phase discriminator 88 by way of a phase shift network 89 which is arranged to retard the phase of the oscillations supplied thereto by the oscillator 85 by substantially 90°. An oscillator 90 supplies oscillations of the frequency F2 to each of the phase discriminators 87 and 88 and also to each of the corresponding phase discriminators 91 and 92 of the control circuit 84. Each of the phase discriminators 87 and 88 is arranged to produce a direct current output signal the value of which varies according to the phase of the oscillations supplied thereto that are produced by the oscillator 85 relative to the phase of the oscillations obtained from the oscillator 90. These direct current output signals are amplified substantially equally by direct current amplifiers 93 and 94 and the amplified signals are supplied over lines 95 and 96 to the phase shifter 71. The corresponding amplified signals obtained from the control circuit 84 are supplied over lines 97 and 98 to the phase shifter 72.

The waveguide structure 68 is shown schematically in FIGURE 4 to which reference should now be made. This structure is constituted mainly by a circular waveguide 100 and has two inlet ports 101 and 102 and two outlet ports 103 and 104 that are in rectangular waveguide. The ports 101 and 102 are mutually perpendicular and are coupled through rectangular waveguide (not shown) to the antennae 64 and 65 (FIGURE 3) respectively. A transducer section 105 which has the inlet ports 101 and 102, is coupled to the phase modulator 69 which, in the present example, is a so-called "Faraday rotation polarisation modulator" and which comprises a rod 106 of ferrite material mounted in a disc 107 of dielectric material that is fixed within the circular waveguide 100 so that the rod is coaxial with the longitudinal axis 108 of that waveguide, and an electric winding 109 which is carried by the circular waveguide 100 in the vicinity of the ferrite rod 106 and which is connected between the line 74 (FIGURE 3) and earth potential.

The phase modulator 69 is followed by the phase shifter 71 which, in the present example, is a so-called "quarter-wave plate" and comprises a plate 110 of suitable dielectric material, for example, quartz mounted for rotation about the longitudinal axis 108 of the circular waveguide 100. The dimensions of the plate 110 are such that it introduces a differential phase shift of 90° for polarisation normal and parallel thereto.

The phase shifter 71 is followed by the phase modulator 70 which is identical with the phase modulator 69 and which has its electric winding 111 connected between the line 76 (FIGURE 3) and earth potential. The phase shifter 72 follows the phase modulator 70 and, in the present example, is a so-called "half wave plate." Thus the phase shifter 72 comprises a plate 112 of dielectric material which is mounted for rotation about the longitudinal axis 108 of the circular waveguide 100 and which is dimensioned so that it introduces a differential phase shift of 180° for polarisation normal and parallel thereto.

The phase shifter 72 is coupled to a transducer section 113 which has the outlet ports 103 and 104. These ports 103 and 104 are mutually perpendicular and in the present structure are positioned so that they each have the same orientation as a different one of the inlet ports 101 and 102 although this is not essential. The output port 104 is coupled through rectangular waveguide (not shown) to the radio receiver 67 (FIGURE 3) of the system. The other outlet port 103 is coupled through rectangular waveguide (not shown) to a matched load 99 (FIGURE 3) but alternatively may be so coupled to a standby radio receiver (not shown) which is for use in the event of failure of the radio receiver 67.

For a detailed description of the phase shifter 71, reference should now be made to FIGURE 5 where the portion of the circular waveguide 100 appertaining to this phase shifter is shown sectioned in the plane of the plate 110. The plate 110 is mounted for rotation about the longitudinal axis 108 of the circular waveguide 100 by means of brass pivots 115 and 116 which are embedded in the ends of the plate and which extend into small apertures formed through bearing members 117 and 118. These bearing members 117 and 118 comprise circular discs of polytetrafluorethylene which are fixed within the circular waveguide 100 as, for example, by means of screws (not shown) of nylon that engage threaded holes in those discs. The end portions of the plate 110 are stepped in known manner for the purpose of reducing the impedance discontinuity along the circular waveguide 100 which arises from the presence of the plate.

Strips 119 and 120 of mild steel are carried by the plate 110 adjacent to its side edges. The plate 110 is arranged to be rotated to any angular position about the longitudinal axis 108 of the circular waveguide 100 by varying two mutually perpendicular components of a magnetic field acting on the strips 119 and 120. These two components of the magnetic field are arranged to be produced respectively by two sinusoidally distributed windings 121 and 122 which cannot be seen separately. These windings 121 and 122 are carried by a stator 123 which embraces the circular waveguide 100 in the vicinity of the strips 119 and 120. The said two windings 121 and 122 of the stator 123 are energised by the direct current signals which are supplied over the lines 95 and 96 (FIGURE 3) respectively by the associated control circuit 83.

The phase shifter 72 has substantially the same construction as is described above for the phase shifter 71, the two windings of its stator (not shown) being energised by the direct curent signals which are supplied over the lines 97 and 98 (FIGURE 3) respectively by the associated control circuit 84. The only difference between the phase shifters 71 and 72 is that the length of the plate 112, and hence the separation between the associated bearing members (not shown), is greater than that of the plate 110.

During operation of the system described above with reference to FIGURES 3, 4 and 5 the two plane polarised radio frequency signals which are obtained from the antennae 64 and 65 and which are supplied to the inlet ports 101 and 102 of the waveguide structure 68 combine to produce an elliptically polarised wave in the transducer section 105. This is because the orientation of the inlet ports 101 and 102 is such that these radio frequency signals are launched into the transducer section 105 in space quadrature. This elliptically polarised wave is phase modulated at the frequency F1 in passing through the phase modulator 69 and is then applied to the phase shifter 71.

As previously mentioned, an elliptically-polarised wave is equivalent to two plane polarised waves of equal magnitude that are polarised in directions which are each at an angle of 45° to the major axis of the corresponding elliptical polarisation. It is arranged by means of the control circuit 83 that the plate 110 in the phase shifter 71 is positioned automatically so that it is always substantially in line with the major axis of the said elliptically-polarised wave. In this way, the said elliptically-polarised wave is converted by the phase shifter 71 into two circularly-polarised waves which are of equal amplitude but which are polarised in opposite senses. These circularly-polarised waves are equivalent to a single plane-polarised signal, the direction of polarisation of which is dependent upon the phase difference between those waves.

The circularly-polarised waves are differentially phase-modulated at the frequency F1 in passing through the phase modulator 70 and then are applied to the phase shifter 72. It is arranged by means of the control circuit 84 that the angular position of the plate 112 in the phase shifter 72 is positioned automatically to adjust the relative phase of the said two circularly-polarised waves so that their equivalent plane-polarised signal is polarised in the direction appropriate to the appearance at the outlet port 104 of all the energy of this signal and hence of the two corresponding signals supplied to the inlet ports 101 and 102.

As the result of the supply to the radio receiver 67 of the combined radio frequency outputs from the antennae 64 and 65 there are supplied to the line 78 the two envelope wave components of the frequency F1 that are due to the phase-modulation effected by the modulators 69 and 70 respectively. The phase of the envelope wave component appertaining to the modulator 69 relative to the phase of reference signal of the frequency F1 that is supplied over the line 81 to the phase sensitive detector 79, and hence the value of the direct current output signal produced by this detector 79, are determined by the sense of the error, if any, in the adjustment of the phase shifter 71. Similarly the phase of the envelope wave component appertaining to the modulator 70 relative to the phase of the reference signal of the frequency F1 that is supplied over the line 82 to the phase sensitive detector 80 and hence the value of the direct current output signal produced by this detector 80 are determined by the sense of the error, if any, in the adjustment of the phase shifter 72. Usually the errors in the adjustments of the phase shifters 71 and 72 are small and the said two envelope wave components are substantially in phase with the reference signals on the lines 81 and 82 respectively. In other words these envelope wave components usually are substantially in phase quadrature so that they each affect the appropriate one only of the phase sensitive detectors 79 and 80.

Each control circuit, for example, the control circuit 83, is arranged so that if the phase of the oscillations supplied to the phase discriminator 87 by the oscillator 85 differs from the phase of the reference signal produced by the oscillator 90 by an angle $\theta$ the corresponding direct current signals that are supplied to the associated phase shifter 71 over the lines 95 and 96 have values $A \sin \theta$ $A \sin (90-\theta)$ respectively. Consequently the two mutually perpendicular components of the magnetic field set up within the portion (FIGURE 5) of circular waveguide 100 appertaining to the phase shifter 71 that are due to the energisation of the windings 121 and 122 respectively with these direct current signals attain magnitudes $B \sin \theta$ and $B \cos \theta$. Therefore the plate 110 takes up a setting wherein it is at an angle $\theta$ to the reference position attained thereby if only the winding 122 is energised.

Let it be assumed that the phase shifter 71 is correctly adjusted and that the particular value of the angle $\theta$ between its plate 110 and said reference position is then $\theta_1$. The control circuit 83 is arranged so that under these conditions its oscillator 85 and the oscillator 90 are generating oscillations which are of the same frequency F2 but which differ in phase by the angle $\theta_1$. Therefore the plate 110 is maintained in this correct setting.

The occurrence of an error in the setting of the plate 110 gives rise to a phase difference between the envelope wave component appertaining to the modulator 69 and the reference signal of the frequency F1 that is supplied to the phase sensitive detector 79 over the line 81. The resulting value of the direct current output signal that is supplied to the reactance modulator 86 by the phase sensitive detector 79 causes the operating frequency of the oscillator 85 to be changed slightly from the frequency F2. The sense of this change in frequency is such that the corresponding change in the value of the phase angle $\theta$ results in the reduction of said error.

Changes in the adjustment of the phase shifter 72 are effected by the control circuit 84 in a similar manner to that described above for the control circuit 83. However, in as much as any alteration in the adjustment of the phase shifter 71 necessitates an alteration in the adjustment of the phase shifter 72, the control circuit 83 is arranged to have a quicker response than the control circuit 84.

It will be appreciated that there exists an alternative setting of the phase shifter 72 such that there is propagated in the outlet port 103 a plane-polarised radio frequency signal which contains all the energy of the corresponding plane-polarised signals supplied to the inlet ports 101 and 102. Therefore a standby radio receiver (not shown) may be connected to the outlet port 103 in place of the matched load 99 and the control circuit 84 may be adapted to adjust the phase shifter 72 to this alternative setting in the event of the radio receiver 67 failing.

It has previously been mentioned that the same effect as differential phase-modulation is obtained by oscillating the plate of a phase shifter, for example, the plate 56 of the phase shifter 55 (FIGURE 2) through a small angle about its axis of rotation at the modulating frequency. To apply this feature to a waveguide structure (not shown) which is suitable for incorporation into the combining arrangement 66 of FIGURE 3 in place of the waveguide structure of FIGURE 4 and in which the plates of dielectric material that correspond to the plates 110 and 112 are oscillated at a common frequency F1, it is necessary to have the oscillations of one of those plates retarded by one quarter of the oscillation cycle with respect to the oscillations of the other one of those plates so as to obtain the equivalent of the 90° phase shift provided by the phase shift network 75.

Should it be necessary to combine the radio frequency signals received simultaneously on more than two spaced antennae a number of electric signal combining arrangements, which are each according to the present invention, may be connected in cascade, two of said signals being supplied to a first one of these combining arrangements and each remaining combining arrangement being supplied with a further one of said signals and with the output signal provided by the preceding arrangement. Alternatively, for any four said signals to be combined there may be provided three electric signal combining arrangements which are each according to the present invention, two of these combining arrangements being each arranged to combine two of the four said signals and the third combining arrangement being arranged to combine the output signals obtained from the other two.

The feature that is embodied in the provision of the plate 110 of the phase shifter 71 with the mild steel strips 119 and 120 and in the provision of that phase shifter with the windings 121 and 122 so as to facilitate the control of the angular position of the plate 110 by means of direct current signals supplied to these windings can be applied to other waveguide apparatus wherein changes of a characteristic of a wave propagated in a waveguide are effected by varying the angular position of control means.

According to this feature of the present invention, in an arrangement which comprises control means, for example a plate of dielectric material, mounted within a length of waveguide so that it is rotatable relative to that waveguide about a predetermined axis and in which, during operation, changes of a characteristic, for example the phase, of a wave propagated in that length of waveguide are effected by varying the angular position of said control means about said axis, said control means is provided with at least one member of magnetisable material which is located at a distance from said axis of rotation and there are provided a plurality of windings which are fixed relative to said control means and which are arranged to produce a magnetic field upon their energisation that acts upon said member or members of magnetisable material, the arrangement being such that, during operation, the angular position of said control means is determined by the relative values of direct current signals that are supplied to said windings respectively.

We claim:

1. An electric signal combining arrangement for use in a radio diversity receiving system to combine radio frequency signals received simultaneously on two spaced antennae comprising signal transforming means which is arranged to be supplied with the two radio frequency input signals and which is arranged to supply two further radio frequency signals in response to said input signals, each further signal being derived from both said input signals, first adjustable phasing means which is included in said transforming means and which is arranged to afford a control over the relative magnitudes of said further signals, combining means which is arranged to transfer substantially all the energy of said further signals into a single radio frequency output signal only when those further signals are of equal magnitude and have a predetermined phase relationship, second adjustable phasing means to adjust the relative phase of said further signals, and automatic control means which is arranged to control automatically the adjustment of both said phasing means so that, during operation, the magnitudes of said further signals are maintained substantially equal and the relative phase of said further signals is adjusted to maintain said predetermined phase relationship, the arrangement being such that the output signal obtained, during operation, from said combining means contains substantially all the energy of the two corresponding radio frequency input signals supplied to said signal transforming means irrespective of the relative levels and phases of said input signals.

2. An electric signal combining arrangement according to claim 1 including an adjustable phasing means which is constructed in circular waveguide and which comprises a plate of dielectric material that is mounted for rotation about the longitudinal axis of the circular waveguide, adjustments of this phasing means being constituted by changes in the angular position of this plate, a member of magnetisable material carried by the plate at a distance from said axis, and a plurality of windings fixed relative to said plate and arranged to produce a magnetic field upon their energisation with direct current signals that acts upon said magnetisable member so as to cause said plate to assume an angular position determined by the values of those signals.

3. An electric signal combining arrangement according to claim 2 wherein the phasing means has two windings only which are arranged to produce two mutually perpendicular components respectively of said magnetic field upon their energisation.

4. An electric signal combining arrangement according to claim 3 wherein said automatic control means includes a reference oscillator for producing reference oscillations of a predetermined frequency, a variable oscillator for producing oscillations of any particular frequency within a range which includes said predetermined frequency, means for varying the operating frequency of said variable oscillator relative to said predetermined frequency according to the value of the error, if any, in the angular position of said plate, phase shifting means for retarding by substantially 90° the phase of oscillations produced, during operation, by said variable oscillator, control means for automatically controlling the value of the direct current signal supplied, during operation, to one of said two windings according to the phase of the oscillations obtained from said variable oscillator relative to the phase of said reference oscillations and control means for automatically controlling the value of the direct current signal supplied, during operation, to the other one of said windings according to the phase of the oscillations obtained from said phase shifting means relative to the phase of said reference oscillations, the arrangement being such that, during operation, the occurrence of an error in the angular position of said plate gives rise to changes in the values of said direct current signals that tend to produce a reduction of said error.

5. An electric signal combining arrangement according to claim 1 wherein said automatic control means comprises first modulating means whereby radio frequency signals that are supplied, during operation, to said first phasing means are arranged to be differentially phase-modulated with a first reference signal, second modulating means whereby radio frequency signals that are supplied, during operation, to said second phasing means are arranged to be differentially phase-modulated with a second reference signal, means to derive from said output signal the two envelope waves of amplitude-modulation that are due to said differential phase-modulation with said first and second reference signals respectively, means for automatically controlling the adjustment of said first phasing means according to the phase of the envelope wave component corresponding to said first reference signal and means for automatically controlling the adjustment of said second phasing means according to the phase of the other envelope wave component.

6. An electric signal combining arrangement according to claim 5 wherein said first and second reference signals have the same frequency and have a phase relationship such that the said two envelope wave components which are derived, during operation, from said output signal are substantially in phase quadrature.

7. An electric signal combining arrangement according to claim 6 wherein said automatic control means includes an electric oscillator for generating both said reference signals and a phase shift network for retarding the phase of one of those reference signals by substantially 90° with respect to the other reference signal.

8. An electric signal combining arrangement according to claim 5 wherein said means to derive said two envelope wave components from said output signal comprises frequency changing means to derive an intermediate frequency signal from said output signal and demodulator means to derive said envelope wave components from said intermediate frequency signal.

9. An electric signal combining arrangement according to claim 8 which includes part of a superheterodyne radio receiver that is arranged to demodulate said output signal and wherein said frequency changing means comprises at least the mixer stage of said radio receiver.

10. An electric signal combining arrangement according to claim 5 wherein the first and second phasing means each includes a member which is rotatable to vary the phase shift produced upon a signal supplied to its said phasing means, wherein the means for automatically controlling the adjustment of said first and second phasing means are arranged to control the angular positions of said members of said first and second phasing means respectively, wherein the first and second reference signals have different frequencies, and wherein the first and second modulating means are arranged to oscillate said members of said first and second phasing means respectively each through a small angle at the frequency of said first and second reference signals respectively.

11. An electrical signal combining arrangement according to claim 5 wherein the first and second phasing means each includes a member which is rotatable to vary the phase shift produced upon a signal supplied to its said phasing means, wherein the means for automatically controlling the adjustment of said first and second phasing means are arranged to control the angular position of said members of said first and second phasing means respectively, wherein the first and second reference signals have the same frequency, and wherein the first and second modulating means are arranged to oscillate said members of said first and second phasing means respectively each through a small angle at the common frequency of said two reference signals and so that the oscillations of one of those members are retarded by substantially one quarter of the oscillation cycle with respect to the oscillations of the other member.

12. An electric signal combining arrangement for use in a radio diversity receiving system to combine radio frequency signals received simultaneously on two spaced antennae comprising first hybrid means which is arranged to be supplied with the two radio frequency input signals to be combined and which is arranged to combine said input signals so as to produce two further radio frequency signals, first adjustable phasing means for adjusting the relative phase of the signals that are supplied, during operation, to said first hybrid means, second hybrid means which is for combining said further signals into a single output signal, second adjustable phasing means for adjusting the relative phase of said further signals that are supplied, during operation, to said second hybrid means and automatic control means which is arranged to control automatically the adjustment of both said phasing means, the arrangement being such that the output signal obtained, during operation, from said second hybrid means contains substantially all the energy of the two corresponding radio frequency input signals supplied to the combining arrangement irrespective of the relative levels and phases of said input signals.

13. An electric signal combining arrangement, for use in a radio diversity receiving system to combine two plane-polarised radio frequency waves obtained from two spaced antennae respectively comprising transducer means which is arranged to be supplied with the two input waves to be combined so that the planes of polarisation of said input waves are generally at right angles and which is arranged to resolve said input waves into two other waves that are polarised in predetermined planes at right angles to one another, each of said other waves being derived from both said input waves, first adjustable phasing means which is arranged to afford a control over the relative magnitudes of said other waves, converting means which is arranged to be supplied with said other waves and which is arranged to convert two waves of equal magnitude that are polarised in said predetermined planes into two further waves of polarisation such that they can be resolved into a single wave which is polarised in a plane determined by the relative phase of said further waves, second adjustable phasing means to adjust the relative phase of said further waves that are obtained, during operation, from said converting means, automatic control means having a first control circuit which is arranged to control automatically the adjustment of said first adjustable phasing means so as, during operation, to maintain the magnitudes of said other waves substantially equal and a second control circuit which is arranged to control automatically the adjustment of said second adjustable phasing means so as, during operation, to maintain the relative phase of said further waves such that they can be resolved into a wave which is polarised in a particular plane, and combining means which is arranged to resolve said further waves into the corresponding plane-polarised wave and which has an output arm for propagating a wave that is polarised in said particular plane, the arrangement being such that, during operation, there is propagated in said output arm as an output signal a plane-polarised wave which contains substantially all the energy of the two corresponding input plane-polarised waves supplied to said transducer means irrespective of the relative levels and phases of said input waves.

14. An electrical signal combining arrangement according to claim 13 wherein the transducer means, the first and second adjustable phasing means, the converting means and the combining means are all constituted by a waveguide structure which is constructed mainly in circular waveguide, wherein said transducer means has two inlet ports in rectangular waveguide whereby it is arranged to be supplied with the two input waves, wherein the output arm of said combining means comprises an outlet port in rectangular waveguide, and wherein said converting means comprises a fixed plate of dielectric material that is arranged to introduce a differential phase shift of substantially 90° for polarisation normal and parallel thereto so as to convert the other waves which are supplied to said converting means into two circularly-polarised radio frequency waves which are polarised in opposite senses.

15. An electric signal combining arrangement for use in a radio diversity receiving system to combine two plane-polarised radio frequency waves obtained from two spaced antennae respectively comprising transducer means which is arranged to be supplied with the two input waves to be combined so that the planes of polarisation of said input waves are generally at right angles, first adjustable phasing means that is arranged to derive from the input waves that are supplied, during operation, to said transducer means, two further waves of which the relative magnitudes depend upon the setting of this phasing means and of which the polarisation is such that when their magnitudes are equal they can be resolved into a single radio frequency wave that is polarised in a plane determined by the relative phase of said further waves, each of said further waves being derived from both said input waves, second adjustable phasing means to adjust the relative phase of said further waves that are obtained, during operation, from said first adjustable phasing means, automatic control means having a first control circuit which is arranged to control automatically the setting of said first adjustable phasing means so that, during operation, the magnitudes of said further waves are maintained substantially equal, and a second control circuit which is arranged to control automatically the adjustment of said second adjustable phasing means so as, during operation, to maintain the relative phase of said further waves such that they can be resolved into a wave which is polarised in a particular plane, and combining means which is arranged to resolve said further waves into the corresponding plane-polarised wave and which has an output arm for propagating a wave that is polarised in said particular plane, the arrangement being such that, during operation, there is propagated in said output arm as an output signal a plane-polarised wave which contains substantially all the energy of the two corresponding input plane-polarised waves supplied to said transducer means irrespective of the relative levels and phases of said input waves.

References Cited by the Examiner

UNITED STATES PATENTS

| | | | |
|---|---|---|---|
| 2,593,120 | 4/52 | Dicke | 333—11 |
| 2,821,701 | 1/58 | Vogeley et al. | 333—11 |
| 2,844,716 | 7/58 | Jacobsen | 325—369 |
| 2,854,568 | 9/58 | Lewin et al. | 325—367 |
| 2,975,275 | 3/61 | Adams | 325—56 |
| 2,997,655 | 8/61 | Petrich | 333—11 |

DAVID G. REDINBAUGH, *Primary Examiner.*